J. FORBES.
ELECTRICAL APPARATUS TO INDICATE OVERSTRAIN OR WEAKNESS IN ROOFS, BRIDGES OR OTHER STRUCTURES.
No. 192,909. Patented July 10, 1877.
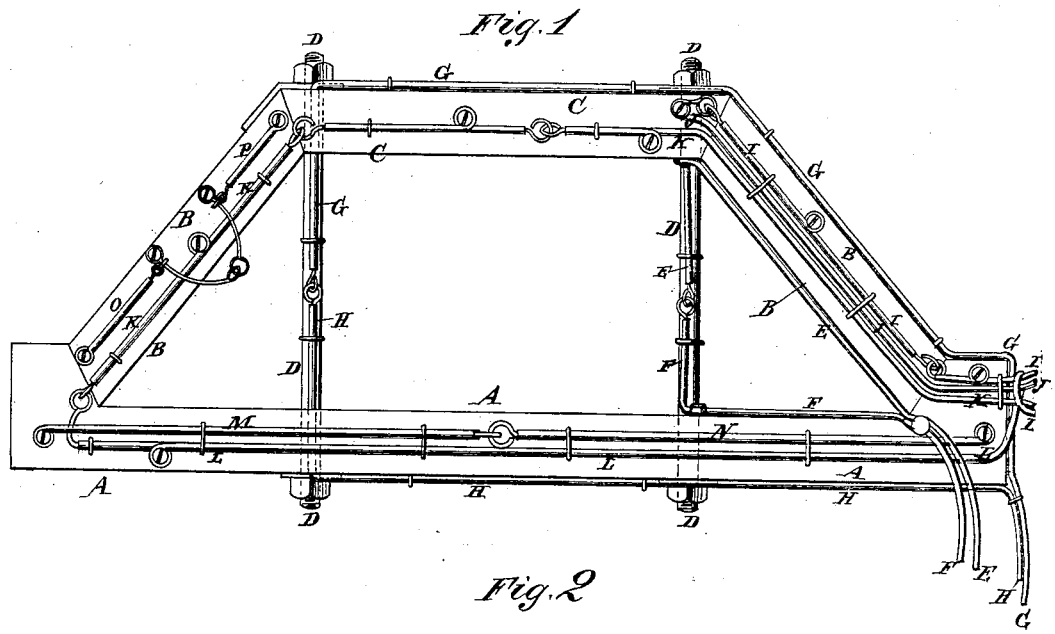
Fig. 2
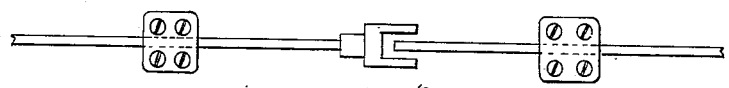
Fig. 3
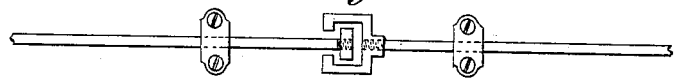
Fig. 4
Fig. 5
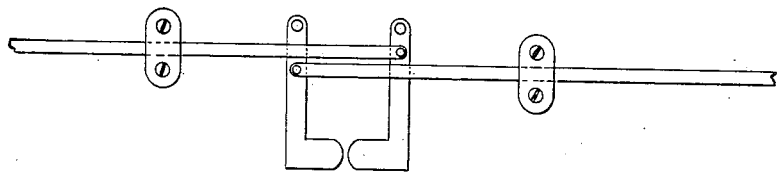
WITNESSES:
A. W. Almquist
J. H. Scarborough
INVENTOR:
John Forbes.
BY
ATTORNEYS.

UNITED STATES PATENT OFFICE.

JOHN FORBES, OF DARTMOUTH, HALIFAX, NOVA SCOTIA, CANADA.

IMPROVEMENT IN ELECTRICAL APPARATUS TO INDICATE OVERSTRAIN OR WEAKNESS IN ROOFS, BRIDGES, OR OTHER STRUCTURES.

Specification forming part of Letters Patent No. 192,909, dated July 10, 1877; application filed May 5, 1877.

*To all whom it may concern:*

Be it known that I, JOHN FORBES, of Dartmouth, Halifax, in the Province of Nova Scotia and Dominion of Canada, have invented a new and useful Improvement in Electric Overstrain Motion or Weakness-Indicator, of which the following is a specification:

Figure 1 is a side view of a truss to which my improvement has been applied. Figs. 2, 3, 4, and 5 represent different forms of terminals.

Similar letters of reference indicate corresponding parts.

This invention relates to certain means of obtaining a prompt indication of the unsafe condition of such structures as bridges, roofs, &c., when such unsafe condition is caused by overloading or undue or excessive strain of any member or of the whole structure, or by derangement of parts at joints or connections, or by any change of condition, either sudden or gradual, from that under which the structure was designed to serve.

In the case of a bridge, for instance, the various members of which are subjected to either tensile or compressive strain, the several proportions of such members are so adjusted as to afford a determined margin between the ultimate breaking load or strain and the greatest load or strain to which such member is intended to be exposed under traffic or use. This margin may be reduced by various causes, as the passage of an excessive load, a sudden jar produced by slight obstructions to, or perhaps partial derailment of, wheels, breaking of flanges, &c., or within the structure itself, loosening of rivets, gradual weakening of the member under frequent repetitions of the load, imperfect workmanship, flaws in the material, or errors of calculation not apparent at the time of erection. Such lessening of the margin of safety need not be fatal to the structure, provided it can be detected and suitable remedial measures promptly adopted and the originally-designed margin of safety obtained.

In the case of members exposed to tensile or compressive strain no permanent injury will result until the limit of elasticity of material is exceeded. Indication of overloading will be recorded before this limit has been reached.

In the case of dislocation or derangement of parts, as the slipping out of position or shutting by of butted joints—as in upper chords, or vertical posts, or oblique struts—in all such and in all similar or analogous cases, it is the object of my invention to furnish a ready means of obtaining a direct indication that such overstrain or derangement has taken place, although no permanent set or immediately apparent evidence may have been left upon the member or structure itself.

My invention consists in attaching upon each member of the structure an insulated wire or conductor, so arranged that an electric circuit may be made or broken by the abnormal condition resulting from the excessive strain or dislocation of parts, from whatever cause it may arise, through which a motion either in the substance of the member itself or between contiguous and adjoining members has taken place, the closing or rupture of the circuit to be indicated by an annunciator, operated by the electric current from a battery through electro-magnets suitably arranged, the armature of the magnets being so adjusted that, as in the case of hotel call-bells, a number or indicator shall be exposed, said number to indicate a particular part or member of the structure.

I propose to employ terminals so arranged that, in the case of tensile members, the sum of the extra extension caused by overstrain shall unite the terminals and complete the circuit, and in the case of compression-members the terminals to be so arranged that the sum of the extra compression caused by overstrain shall in that case also unite the terminals and complete the circuit, and thus in either case produce an indication. The same result, if under any circumstances it should be more convenient, can also be produced by the rupture of a closed circuit.

In the case of joints or any similar portions of structure upon the integrity of which the margin of safety depends, the same arrangement as before described may be made to indicate the part in which dislocation or derangement of parts has taken place.

The several return-wires may be all separately connected with the battery, or they may be all joined and a single wire pass from their junction, and a suitable switch provided in it, so that only a permanent derangement or set or dislocation may be indicated, and that only when a connection shall be made with the battery on the occasion of the visit of the inspector to the annunciator, which may be done previous to the entry of a train or at stated intervals.

The drawings represent a simple six-part truss, viz., an upper chord, C, a lower chord, A, two main braces, B, and two tension or queen rods, D, being three members in compression and three in tension.

The insulated conductors E F G H I J K L may, in practice, be secured upon the various members in any convenient way, notably by small screws through lugs, or by pinching bands, &c., the separated terminals, as shown in the drawing, constituting the open-circuit system. Eyes at the terminals, having an inside diameter as much larger than the diameter of the material of the other terminal as will admit of certain latitude of motion, corresponding with the margin of motion decided upon as admissible before indication is required would seem to be a convenient and well-adapted shape in many cases; and other forms of terminals may be used.

The terminals may be gilt, nickeled, or platinized, in order to insure proper conductivity at point of contact.

Having thus described my invention, I claim as new and desire to secure by Letters Patent—

The combination, with a bridge, roof, or other structure, of a system of insulated conductors and a circuit-closer, so arranged that any abnormal condition resulting from overstrain or other cause tending to reduce the originally-designed margin of safety shall be indicated (by completion or rupture of the circuit) upon an annunciator suitably situated and connected for the purpose, substantially as herein described and set forth.

JOHN FORBES.

Witnesses:
GEORGE McKEOWN,
JAS. W. CALDWELL.